Figure 1:
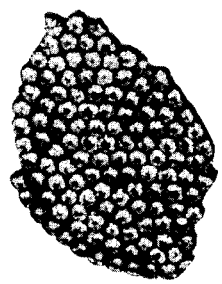

United States Patent [19]

Sturge et al.

[11] 3,758,648

[45] Sept. 11, 1973

[54] NUCLEAR FUEL COMPACTS OF COATED PARTICLE FUEL

[75] Inventors: Derek William James Sturge; John Richard Cox Gough, both of Winfrith, England

[73] Assignee: United Kingdom Atomic Energy Authority, London, England

[22] Filed: Mar. 27, 1970

[21] Appl. No.: 23,397

[30] Foreign Application Priority Data
July 11, 1969 Great Britain .................. 35,156/69

[52] U.S. Cl. ................ 264/0.5, 176/89, 176/91 SP
[51] Int. Cl. ........................................... G21c 21/02
[58] Field of Search ...................... 264/0.5; 176/89, 176/91 SP

[56] References Cited
UNITED STATES PATENTS

| | | | |
|---|---|---|---|
| 3,492,379 | 1/1970 | Redding et al. ...................... | 264/0.5 |
| 3,158,547 | 11/1964 | Smith ............................... | 176/89 X |
| 3,255,278 | 6/1966 | Smith ............................... | 264/0.5 |
| 3,255,279 | 6/1966 | Smith ............................... | 264/0.5 |
| 3,344,211 | 9/1967 | Redding et al. ...................... | 264/0.5 |
| 3,439,073 | 4/1969 | Howard et al. ...................... | 264/0.5 |
| 3,438,858 | 4/1969 | Howard et al. ................... | 264/0.5 X |
| 3,558,750 | 1/1971 | Davis et al. ....................... | 264/0.5 X |
| 3,488,409 | 1/1970 | Beutler et al. ....................... | 264/0.5 |
| 3,161,504 | 12/1964 | Black et al. .......................... | 264/0.5 |

FOREIGN PATENTS OR APPLICATIONS
1,206,559   9/1970   Great Britain ....................... 264/0.5

*Primary Examiner*—Carl D. Quarforth
*Assistant Examiner*—Roger S. Gaither
*Attorney*—Larson & Taylor

[57] ABSTRACT

In the forming of a nuclear fuel containing body composed of fission product retaining coated fuel particles in a matrix material it has been convenient to proceed by overcoating each particle with its share of the matrix material incorporating a polymerisable resin and then to press a mass of these in a die, which is heated first to melt the resin and then to effect polymerisation. This resulted in some edge particles protruding through their overcoating and having their fission product retaining coatings damaged. The present invention reduces the risk of such damage by providing a layer of matrix material between the cavity surfaces and the overcoated particles near the edge of the mass which, on pressing, acts as a buffer during the pressing stage and becomes an integral part of the body during the polymerisation stage.

4 Claims, 4 Drawing Figures

Patented Sept. 11, 1973

3,758,648

INVENTORS
DEREK WILLIAM JAMES STURGE
JOHN RICHARD COX GOUGH

BY Larson and Taylor

ATTORNEYS

NUCLEAR FUEL COMPACTS OF COATED PARTICLE FUEL

BACKGROUND OF THE INVENTION

This invention relates to processes for making nuclear fuel containing bodies by pressing.

Nuclear reactors which are designed to operate with high coolant temperatures may employ fuel in the form of kernels of nuclear fuel oxides or carbides, each kernel being coated with a fission product retaining layer to form a coated particle. One method of employing fuel of this kind is to fill a container with a loose mass of the coated nuclear fuel kernels. An alternative, and sometimes preferred way, is to form a given quantity of particles into a coherent artefact. For example, it has been proposed to bond particles together by means of a synthetic resin or a synthetic resin/graphite powder mixture, which acts as a bonding agent and/or matrix forming material. An advantageous manner for putting this bonding process into practice has been described in U.S. Pat. No. 3,344,211 and in this process the kernels which have been coated with layers of fission product retaining materials are then overcoated with a layer of a matrix forming material in the form of a graphite/resin mixture. This overcoat may either be inherently soft and deformable or may become so on the application of heat. Hitherto, a coherent body formed of a mass of these overcoated particles has been made by incorporating a polymerisable resin in the overcoating, placing the overcoated particles in a die and pressing them whilst at the same time heating to melt the resin and after movement due to pressing had ceased, heating the pressed material to polymerise the resin. Pressure is necessary to ensure that the final artefact produced contains the requisite number of coated particles in a given volume (referred to as the requisite volume loading) and also to ensure a good bond between adjacent particles. However, in practice, it is found that there is a serious risk of some coated particles being pressed through their soft overcoatings into contact with the hard surfaces of the die causing cracking of the fission product retaining coating.

The pressures employed in these pressing processes are of the order of 2000 psi. The maximum point load a contemporary fission product retaining particle can withstand is ~9 pounds and hence it will be appreciated that a grave danger of fracturing the coating exists.

SUMMARY OF THE INVENTION

The present invention is based on the concept that if one can cause compaction of a mass of overcoated particles by the application of pressure in a substantially hydrostatic manner the risk of fracture will be reduced. Thus, while overcoated particles in the centre of the mass would experience a hydrostatic pressure, those at the edges of the mass may not. According to the invention, the pressure is applied to a mass of overcoated particles through a deformable member of the same material as the overcoating material which member becomes part of the pressed body. The risk of fracturing the fission product retaining coating of outermost particles is reduced by this technique for it can be shown that contemporary coated particles can withstand a pressure of many tons applied substantially hydrostatically, e.g. 19 tons per sq. inch.

According to the invention, there is provided a process for forming a nuclear fuel containing body by pressing, the body comprising a number of nuclear fuel particles, each having a fission product retaining coating, distributed in a firm matrix material which incorporates a polymerised bonding agent, the process comprising the steps of applying to each of a number of coated particles an overcoating of matrix material with its bonding agent in an unpolymerised condition and of a thickness to give, on pressing, a body of the required fuel content per unit volume of the body, placing the particles in a cavity, in which they are to be pressed, with a layer of matrix material containing unpolymerised bonding agent disposed against at least some inner surfaces of the cavity such that the coated fuel particles adjacent said inner surfaces are separated from these surfaces by a layer of unpolymerised bonding agent greater than the thickness of the overcoating on these particles, pressing the particles in the cavity whilst heating them to melt the bonding agent and maintaining the pressure whilst further heating the cavity contents to polymerise the bonding agent.

The cavity may be a die cavity from which the body is ejected after polymerisation of the filler. The layer of matrix material may be in the form of a preformed coupon placed on one or more surfaces of the die cavity to reduce the effect of particles protruding through their overcoating.

The preformed coupons or buffers of matrix material are preferably composed of the same material used in the overcoating, e.g. graphite powder in admixture with a polymerisable binder, such as phenolformaldehyde resin. The heat applied is preferably controlled so that the matrix material becomes plastic during initial pressing and does not polymerise. In a particular case the contents of the die were raised to 100°C and subjected to 2000 psi at which temperature the binder in the matrix material was plastic. Then the temperature was raised to 180°C, at this pressure, to polymerise the resin. Plasticisers may be added to the matrix material to promote the plastic condition and improve plasticity during compression.

The buffer layer of matrix material may be provided by an extra thick overcoating layer on those coated particles lying adjacent the internal surfaces of the cavity. Alternatively, the said buffer layer may be provided by a layer of microspheres of matrix material, without fuel, disposed adjacent the surfaces of the cavity. As a further alternative a layer of powdered matrix material may be placed between the overcoated particles and the surfaces of the cavity. In all cases the buffer layer incorporates unpolymerised resin binding agent and becomes a part of the formed body.

DESCRIPTION OF THE PREFERRED EMBODIMENTS 500 grams of nuclear fuel kernels were coated with fission product retaining materials in a conventional manner. These were overcoated with graphite powder which had been precoated with phenolformaldehyde resin. The overcoating was applied in a manner described in U.S. Pat. No. 3,344,211. As a volume loading of 35 percent coated particles was required in the final compact, the proportion of graphite matrix powder required was that amount obtained by overcoating the coated particles to a diameter of about 1613 microns. It is not practical to produce equally sized overcoated particles and hence a range of overcoated particle diameters of from 1557–1680 microns was obtained.

In this way the batch of overcoated particles contained the proportions of materials appropriate to the volume loading specified.

A steel die having a die cavity of the correct shape, in this case that of an annular cylinder, was then assembled. A pair of annular coupons each of dimensions to fit closely into the annular cavity against the end faces of the die and about 1 mm thick were prepared by a conventional moulding technique using graphite matrix powder precoated with phenolformaldehyde resin. One such coupon was placed in the base of the die cavity to form a buffer layer and then the overcoated particles were poured into the cavity. The second coupon also to serve as a buffer was then placed on top of the particles and an annular punch inserted into the die. The whole die was placed in a press and, whilst the die was heated to 100°C a pressure of 2000 psi was applied to the die contents. At this temperature the polymerisable resin melted and the coupons deformed but no excessive pressure was transmitted to the fission product retaining layers of the coated particles, and the tendency for the coated particles to protrude through the overcoat into contact with the die surfaces was reduced. After compaction with the resin content of both the overcoat and the coupon material unpolymerised, the die temperature was raised to 180°C to polymerise the resin whilst the applied pressure was maintained.

After polymerisation of the resin, the pressure was relaxed and the die allowed to cool. The cool compact was removed from the die. Inspection of the samples made so far show that the particles are all submerged in matrix material constituted either by the coupons or by the overcoated layer. This compares favourably with compacts made by a similar process without the annular coupons adjacent to the end faces of the die and merely overcoated, fission product retaining particles have been used. In this latter case, it has been observed that the fission product retaining layers of coated particles are visable on the surface of the compact and in some instances cracks have been seen in these exposed layers.

Such defective compacts could be quite unsuitable for use in a nuclear reactor.

This invention provides therefore a process which aims at maintaining the integrity of coated particle fuel during consolidation into an artefact composed of coated particles dispersed in matrix material and having high volume loadings. This is achieved by causing the matrix to behave in a near hydrostatic manner by bringing the matrix material into a plastic condition at the time that pressing is taking place. Moreover excess matrix material is provided adjacent to the pressed end surfaces of the artefact to ensure an adequate buffer layer between these surfaces and the corresponding surfaces of the die.

Although satisfactory artefacts have been made in accordance with the invention, the technical effect can perhaps be best appreciated from a consideration of the compaction of thin layers of overcoated fuel particles which simulates the end condition of a solid cylindrical artefact.

FIG. 1 shows a portion of a compacted monolayer of overcoated fuel particles and the gaps between adjacent overcoated particles are clearly visible. Each cell consists of a fission product retaining coated particle overcoated with a sufficient thickness of matrix forming material (deformable graphite/resin mixture) to yield in the final artefact a given volume loading of coated particles, in this case 35 percent.

Figure 2:
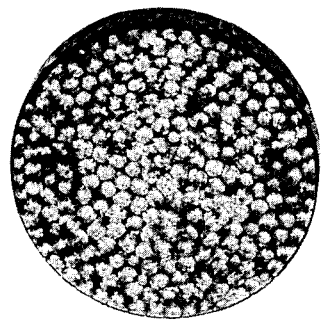

FIG. 2 shows a pressed compact of four layers of the overcoated particles where it can be seen that the overcoating of the other three layers of particles has contributed to filling some of the voids in the end face of the artefact.

Figure 3:
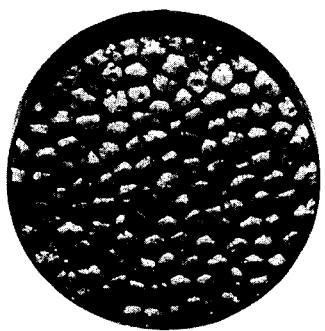

FIG. 3 shows the end face of a pressed artefact composed of overcoated particles to provide a low volume loading of fuel, e.g. the overcoating thickness is greater to provide a greater proportion of matrix material. It will be seen that the overcoatings on the particles are compressed into hexagonal shapes but nevertheless although the voids between cells are filled there are many particles which are protruding through their overcoating and have come into contact with the die surface with the attendant risk of fracture.

Figure 4:
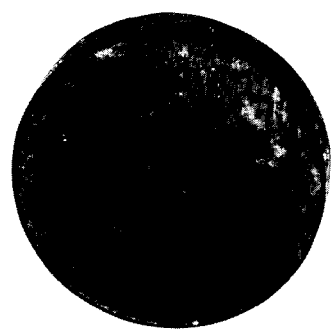

Finally at FIG. 4 is shown an artefact end face which has been pressed with a deformable coupon 1 mm thick of matrix material interposed between the punch of the die and the adjacent face of the artefact according to the invention. It will be seen that the end face does not exhibit voidage between cells and neither are the underlying coated particles visible. The thickness of overcoating on the coated particles is such as to give a coated particle volume loading of 35 percent.

Alternative methods of incorporating the deformable buffer layers of matrix material may be employed. For example the layers may be formed by spraying the material, in powder form or otherwise by placing granules of matrix material in position. As a further alternative the buffer layer is formed from an extra thick overcoating layer on those coated particles which lie adjacent the surfaces of the cavity. For example, these last mentioned particles would have an overcoat whose thickness would be appropriate for a volume loading of only 20 percent (were they to fill the whole cavity) whilst the remaining coated particles have an overcoating layer whose thickness would be appropriate for a volume loading of 30 percent. As a further alternative, the buffer layer may be formed from a number of microspheres of graphite and polymerisable resin (containing no fuel) prepared for example in the manner described in U.S. Pat. No. 3,492,382.

We claim:

1. A process for forming a pressed nuclear fuel containing body comprising a number of nuclear fuel particles, each having a fission product retaining coating, comprising the steps of applying to said number of coated particles, an overcoating of matrix material comprising polymerizable bonding agent in an unpolymerized condition, placing the overcoated particles in a die cavity in which they are to be pressed, providing a separate layer of matrix material comprising unpolymerized bonding agent contiguous with a face of the die contents to be engaged by a pressing plunger such that the coated fuel particles adjacent said face are separated from the pressing plunger by said layer of unpolymerized bonding agent, the thickness of said layer being greater than the thickness of the overcoating on said particles, inserting said plunger into the cavity to press against said face of the die contents while heating said overcoated particles to melt the bonding agent, and maintaining the pressure while further heating the cavity contents to polymerize the bonding agent.

2. A process as claimed in claim 1 wherein said separate layer comprises a preformed coupon of matrix material containing unpolymerized bonding agent.

3. A process as claimed in claim 1 wherein said layer comprises spheres comprising matrix material and unpolymerized bonding agent.

4. A process as claimed in claim 1 in which said layer comprises matrix powder impregnated with unpolymerized bonding agent.

* * * * *